(12) United States Patent
Simon et al.

(10) Patent No.: US 11,686,366 B2
(45) Date of Patent: Jun. 27, 2023

(54) SHOCK ABSORBER AND SHOCK ABSORBER ASSEMBLY

(71) Applicant: Ford Global Technologies, LLC, Dearborn, MI (US)

(72) Inventors: Marc Simon, Cologne (DE); Felix Fischer, Dearborn, MI (US); Teiwen Fehse, Dearborn, MI (US); Olivier Reinertz, Aachen (DE); Katharina Schmitz, Ferndale, MI (US); Ralf Hintzen, Aachen (DE); Achim Lordick, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 17/196,561

(22) Filed: Mar. 9, 2021

(65) Prior Publication Data

US 2021/0277974 A1 Sep. 9, 2021

(30) Foreign Application Priority Data

Mar. 9, 2020 (DE) .......................... 102020106268.0

(51) Int. Cl.
*F16F 9/22* (2006.01)
*F16F 9/43* (2006.01)
*F16F 9/32* (2006.01)
*F16F 9/46* (2006.01)
*B60G 17/018* (2006.01)
(Continued)

(52) U.S. Cl.
CPC ............ *F16F 9/469* (2013.01); *B60G 17/018* (2013.01); *B60G 21/073* (2013.01); *F16F 9/22* (2013.01); *F16F 9/3221* (2013.01); *F16F 9/3257* (2013.01); *F16F 9/435* (2013.01); *B60G 2400/252* (2013.01); *B60G 2800/01* (2013.01); *F16F 9/062* (2013.01); *F16F 9/063* (2013.01); *F16F 9/3235* (2013.01)

(58) Field of Classification Search
CPC ................................ F16F 9/063; F16F 9/3257
USPC ................. 188/286, 322.19, 322.22, 322.23; 267/64.26
See application file for complete search history.

(56) References Cited

U.S. PATENT DOCUMENTS 2,039,135 A * 4/1936 Whiteman .............. F16F 9/063
188/289
3,041,061 A 6/1962 Mearick et al.
(Continued)

FOREIGN PATENT DOCUMENTS

CN 113251095 A * 8/2021
DE 1995279 U 10/1968
(Continued)

*Primary Examiner* — Thomas J Williams
(74) *Attorney, Agent, or Firm* — Burr and Forman LLP; Lorne Forsythe

(57) ABSTRACT

A shock absorber for a wheel suspension of a vehicle may include an outer cylinder, an outer piston that is axially displaceably guided in the outer cylinder, an inner piston that is axially displaceably guided in the outer piston, and a piston rod that is connected to the inner piston and that is guided out of the outer piston. A surface, which is located remote from the piston rod, of a piston portion of the outer piston, which is axially displaceably guided on an inner lateral surface of the outer cylinder, is connected so as to communicate partially with surroundings of the shock absorber.

15 Claims, 2 Drawing Sheets

Figure 1:
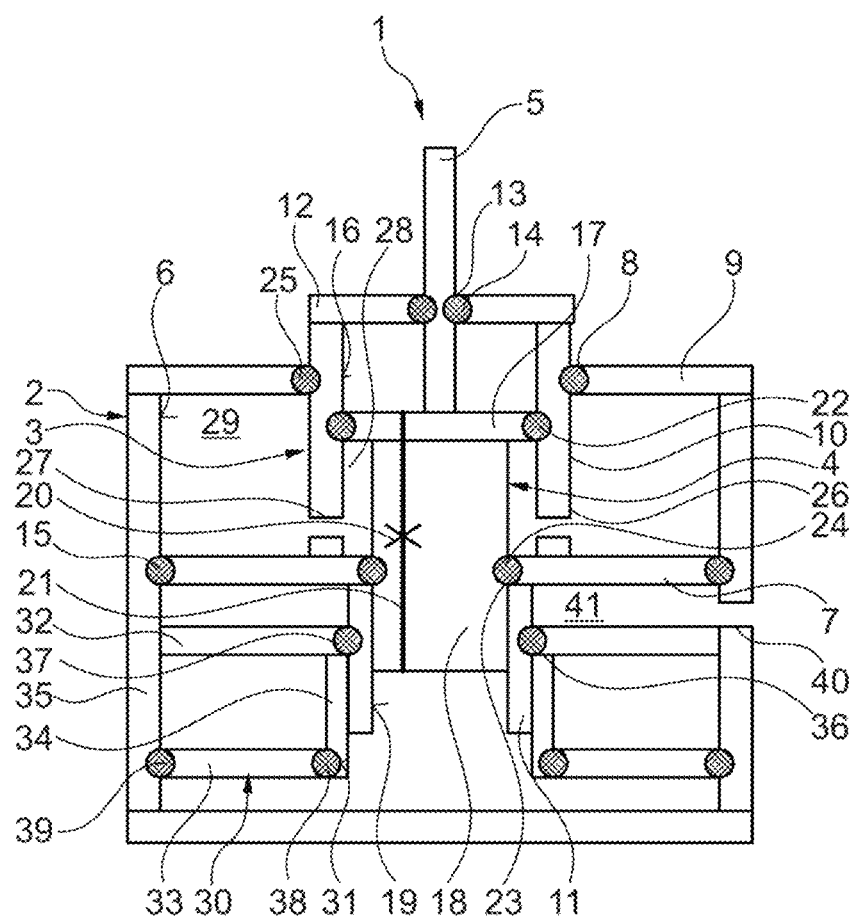

(51) Int. Cl.
*B60G 21/073* (2006.01)
*F16F 9/06* (2006.01)

(56) References Cited

U.S. PATENT DOCUMENTS

| | | | | |
|---|---|---|---|---|
| 3,363,894 A * | 1/1968 | Hill | ............................ | F16F 9/06 |
| | | | | 267/64.15 |
| 4,200,269 A * | 4/1980 | Ludwig | ................ | B60G 17/044 |
| | | | | 267/64.19 |
| 8,167,099 B2 * | 5/2012 | Lassus | .................... | F16F 9/063 |
| | | | | 188/297 |
| 8,899,560 B2 | 12/2014 | Allen et al. | | |
| 2009/0032346 A1 | 2/2009 | Nowaczyk | | |
| 2010/0193308 A1 | 8/2010 | Nowaczyk et al. | | |
| 2011/0140324 A1 * | 6/2011 | Naber | .................. | F16F 9/0472 |
| | | | | 267/140.13 |

FOREIGN PATENT DOCUMENTS

| | | |
|---|---|---|
| DE | 19510092 A1 | 11/1995 |
| DE | 10101177 C1 | 8/2002 |
| JP | 2000240708 A | 9/2000 |
| JP | 2012193824 A | 10/2012 |
| WO | 2007054653 A1 | 5/2007 |

\* cited by examiner

SHOCK ABSORBER AND SHOCK ABSORBER ASSEMBLY

TECHNICAL FIELD

Example embodiments generally relate to motor vehicle suspension, and more particularly relate to a shock absorber for a wheel suspension of a vehicle.

BACKGROUND

When a motor vehicle is traveling, vibrations of various frequencies and amplitudes are transmitted to the motor vehicle by traveling over irregularities on the road surface. So that as far as possible the occupants do not feel these vibrations, wheel suspensions of the motor vehicle are provided with spring-shock absorber systems between the unsprung mass, e.g., the wheels, and the sprung mass, e.g., the vehicle body. The object of the shock absorbers is to damp the acting impacts and/or vibrations and dissipate the impact energy.

The length of a standard shock absorber is generally fixed by a wheel travel and a damper ratio, i.e. the ratio between a wheel movement and a damper movement. In order to achieve a good dynamic vehicle behavior, the damper ratio should be as close as possible to one or above. However, this leads to the shock absorbers becoming very long. The shock absorber length may be defined by the available package and a desired trunk size. This results in design conflicts between the trunk size, shock absorber length, damper travel and the vehicle dynamics.

Conventional proposals for solving this conflict provide a telescopic shock absorber which has a piston rod with a piston, a fixed outer tube and a movable second piston. By the movement of the piston rod, the second piston is entrained via a hydraulic coupling. The components are concentrically arranged and separated by seals. As a result, a constant ratio between the components is achieved. Shock absorbers with such a construction have a high static extension force. This is produced since a pressure booster is generated by the internal construction of the piston surfaces which multiplies the gas force. Thus conventional shock absorber geometries result in the extension forces being too great for use in a normal passenger motor vehicle.

DE 195 10 092 A1 discloses an automatic damper system having a plurality of vibration dampers which in each case have an inner tube with a working chamber for damper fluid in two chambers divided by a piston and first valve means in the inner tube with a first number of through-passages and second valve means arranged in the inner tube with a second number of through-passages, wherein the two valve means are movable relative to one another and thus the throughput of damper fluid between the two chambers of the working chamber is variable. The damper system also has an actuating member, the second valve means being movable thereby relative to the first valve means, wherein the actuating member delivers acceleration and deceleration forces for the second valve means. A plurality of control modules are provided, each control module thereof controlling the actuation of one of the second valve means relative to the first valve means, by a control signal being delivered to an actuating member which is provided for the first and second valve means.

US 2009/0032346 A1 discloses a shock absorber with a pressure tube which forms a working chamber, a piston assembly which is slidably arranged inside the pressure tube and which divides the working chamber into an upper working chamber and into a lower working chamber, a compensation tube which is arranged around the pressure tube, a central tube which is arranged between the pressure tube and the compensation tube, a central chamber which is defined between the central tube and the pressure tube, a first compensation chamber which is defined between the compensation tube and the pressure tube, a first sealing ring which is arranged inside the first compensation chamber and divides the first compensation chamber into an upper compensation chamber and a lower compensation chamber, a valve assembly which is fastened to the compensation tube and has an inlet connected to the central chamber, a first outlet connected to the upper compensation chamber and a second outlet connected to the lower compensation chamber, wherein the valve assembly defines a second compensation chamber.

US 2010/0193308 A1 discloses a shock absorber with a pressure tube which forms a working chamber, a piston assembly which is slidably arranged inside the pressure tube and which divides the working chamber into an upper working chamber and a lower working chamber, a compensation tube which is arranged around the pressure tube, and a central tube which is arranged between the pressure tube and the compensation tube, wherein a central chamber is formed between the central tube and the pressure tube and a compensation chamber is formed between the central tube and the compensation tube. Additionally, the shock absorber has a base valve assembly which is arranged between the lower working chamber and the compensation chamber, a control valve assembly which is fastened to the compensation tube and has an inlet connected to the central chamber and an outlet connected to the compensation chamber, and a tube ring which is arranged between the pressure tube and the central tube and which is not in engagement with the compensation tube, wherein the tube ring isolates the central chamber from the compensation chamber and is in engagement with the central tube at a position remote from the base valve assembly.

U.S. Pat. No. 3,041,061 discloses a telescopable hydraulic shock absorber with a first cylinder, a second cylinder in which the first cylinder is displaceably guided, a first piston which is displaceably guided in the first cylinder and a second piston which is displaceably guided in the second cylinder. The cylinders are connected so as to communicate with one another.

JP 2000 240708 A discloses a damper with a piston-side oil chamber which is divided by a piston in a cylinder and is connected to a reservoir arranged on the circumference of the cylinder via a damping valve which is arranged in the interior of the cylinder at the lower end thereof. The reservoir has a diaphragm in a space which is configured between the cylinder and an outer cylinder arranged on the circumference of the cylinder. In this space a gas chamber is separated by the diaphragm from an oil chamber which is connected via the damping valve to the piston-side oil chamber.

DE 101 01 177 C1 discloses a telescopic vibration damper with a pressure tube filled with a damping medium, in which a piston rod is axially movably arranged and which is axially displaceably guided in an intermediate tube, wherein an annular space between the pressure tube and the intermediate tube is also filled with the damping medium and wherein a flow connection is present between the pressure tube and the annular space and a compensation space receives the displaced volume of the components which may be telescoped relative to one another. The pressure tube has a base on the end side in which a base valve which acts in the retraction direction of the piston rod is arranged in the flow connection between the pressure tube and the annular space, wherein the annular space formed by the intermediate tube and the pressure tube and the pressure tube itself are hydraulically separated from the compensation space by a separating piston.

DE 199 52 79 U discloses a hydraulic telescopic vibration damper with a piston mounted in an articulated manner on one of the components which are supported in an oscillating manner relative to one another and with a cylinder mounted in an articulated manner on the other of the components which are supported in an oscillating manner relative to one another, wherein as a result of the relative movements between the two components and thus between the piston and the cylinder, a hydraulic pressure means is displaced through a throttle between two cylinder chambers. The piston is configured per se to be telescopic, whilst the cylinder is of double-walled design and the throttle is arranged in the inner wall of the cylinder between the outer cylinder chamber and the inner cylinder chamber receiving the piston, whilst the outer cylinder chamber also has an axially displaceable separating plate which separates the part adjoining the throttle from a part of the outer cylinder chamber filled with a pneumatic pressure medium, whilst when the damper is extended ultimately the movements of the outer piston part are limited via a collar at the end of the inner piston part, and the movements of the cylinder are limited via a collar at the end of the outer piston part.

WO 2007/054653 A1 discloses a module for coupling two hydraulic shock absorbers, each thereof being able to be hydraulically connected to two hydraulic chambers which are defined inside two coaxial shells with different diameters and in which pistons are movably arranged, wherein the pistons are connected together. The first piston separates the two hydraulic chambers from one another and the second piston, the diameter thereof being greater than that of the first piston, separates the hydraulic chamber from a compensation chamber which may be filled with a gas. The module has a tubular body which surrounds the shells at a radial distance and has two opposing ends, one end thereof being closed by a base and the other end thereof being closed by a cover.

U.S. Pat. No. 8,167,099 discloses a shock absorber for a landing gear of a rotorcraft with a body which encloses an annular pressure chamber, wherein the shock absorber is provided with at least one pneumatic compensation chamber and with a control piston which is movable relative to the body, wherein the control piston has a rod which protrudes over the body and a head which slides in the pressure chamber. The pressure chamber which is fixedly connected to the body has a radial opening, the cross section thereof being variable as a function of the movement of the piston. The shock absorber is provided with a hydraulic compensation chamber which receives a first fluid which is flushed out of the annular pressure chamber through the radial opening of variable cross section during a movement of the control piston. The annular pressure chamber is provided with a cylindrical inner wall and a cylindrical outer wall in which the radial opening is produced, wherein the inner wall encloses a hollow cylinder tube which forms a first channel. The shock absorber has a second channel in order to connect hydraulically the radial opening of variable cross section to the first channel. The second channel is arranged between the body and the pressure chamber, wherein the first channel feeds into the hydraulic compensation chamber which is arranged in the interior of the rod of the control piston, whereby the pressure chamber and the hydraulic compensation chamber are connected together, wherein a first pneumatic compensation chamber is arranged in the interior of the rod of the control piston between a base of this rod and the hydraulic compensation chamber.

U.S. Pat. No. 8,899,560 discloses a combined springless shock absorber and suspension device with an outer tube, a piston tube (inner tube) and a stationary (damping) tube. A floating piston is arranged in the inner piston tube, wherein the floating piston forms two chambers therein, namely a lower fluid chamber and an upper gas chamber. The fluid damps impacts by passing through a two-way valve in the outer tube and may be controlled internally by a rotatable compensation plate positioned above openings or valve through-passages.

JP 2012 193824 A discloses a hydraulic multi-cylinder shock absorber with a cylinder, a piston which is displaceably inserted into the cylinder in order to divide the interior of the cylinder into a rod-side chamber and a piston-side chamber, a rod which is movably inserted into the cylinder and is connected to the piston, an outer cylinder which encloses the cylinder and forms a reservoir between the outer cylinder and the cylinder, and a bladder which is fastened to the outer circumference of the cylinder or to the inner circumference of the outer cylinder in order to divide the interior of the reservoir into a gas chamber and a fluid chamber, in which the fluid chamber and the piston-side chamber are connected together at one end of the cylinder. The fluid chamber and the piston-side chamber are connected to an annular separating element which is arranged between the fluid chamber and the piston-side chamber and one or more notches which are arranged in a region inside a semi-circle of the separating element.

US 2011/0140324 A1 discloses a damping device with a spring device and a telescopic device which is coupled to the spring device, wherein the telescopic device has a plurality of telescopic elements which are coupled together such that when the telescopic elements are displaced relative to one another a predetermined damping force is produced.

US 2014/0291089 A1 discloses a pressure shock absorbing device with a first cylinder which receives a fluid, a second cylinder which is arranged outside the first cylinder in order to form a fluid storage unit with the first cylinder in which the fluid collects between the first cylinder and the second cylinder, and a dividing element which is arranged in order to be movable in an axial direction in the first cylinder in order to divide a space in the first cylinder into a first fluid chamber and a second fluid chamber which receive the fluid. Moreover, the device has a throttle mechanism which is arranged in a side portion of the second cylinder and has a throttle unit which throttles a flow path cross section of the fluid in order to drain the fluid which has been received by the first cylinder to the fluid storage unit whilst the fluid is passed through the throttle unit. Moreover, the device has a suppression unit which is held by the throttle mechanism at a fluid drainage point between the throttle mechanism and the fluid storage unit in order to suppress air bubbles in the fluid in the fluid storage unit.

US 2011/0162928 A1 discloses a shock absorber of the piston-in-cylinder type which is able to be compressed to less than half of its extended length and which has a rigidly interleaved, opposingly oriented, axially balanced, free-floating bank of gas-charged cylinders.

U.S. Pat. No. 5,024,301 discloses a hydraulic rebound stop assembly for use in a telescopic shock absorber with a working cylinder which contains a fluid, a piston which is displaceably received in the working cylinder and defines a stop for a rebound chamber in the cylinder, and a piston rod which is connected to the piston and extends through an end of the working cylinder. Moreover, the assembly has closing means for closing one end of the cylinder in order to define, together with the piston, the rebound chamber and to mount the piston rod in a displaceable manner. Additionally, the assembly has a cylindrical, cup-shaped outer housing element which is displaceably arranged inside the working cylinder and has a central opening at one end in order to receive the piston rod thereby. Moreover, the assembly has a cylindrical, cup-shaped inner housing element which is attached to the piston rod and which is displaceably arranged in the outer housing element and defines a damping chamber therebetween for receiving the fluid therein. The inner housing element has at one end a central opening for receiving the piston rod. Moreover, the assembly has damping means which are operationally connected to the inner housing part and the outer housing part in order to generate a damping force in the shock absorber according to a predetermined rebound stroke of the piston in the working cylinder.

BRIEF SUMMARY OF SOME EXAMPLES

Some example embodiments may provide a shock absorber which has a large movement range and a shortest possible installation length in the fully compressed state.

In accordance with an example embodiment, a shock absorber for a wheel suspension of a vehicle may be provided. The shock absorber may include an outer cylinder, an outer piston that is axially displaceably guided in the outer cylinder, an inner piston that is axially displaceably guided in the outer piston, and a piston rod that is connected to the inner piston and that is guided out of the outer piston. A surface, which is located remote from the piston rod, of a piston portion of the outer piston, which is axially displaceably guided on an inner lateral surface of the outer cylinder, is connected so as to communicate partially with surroundings of the shock absorber.

In another example embodiment, a shock absorber assembly for a wheel suspension of a vehicle may be provided. The assembly may include a pressure application device, and a shock absorber operably coupled to the pressure application device. The shock absorber may include an outer cylinder, an outer piston that is axially displaceably guided in the outer cylinder, an inner piston that is axially displaceably guided in the outer piston, and a piston rod that is connected to the inner piston and that is guided out of the outer piston. A surface, which is located remote from the piston rod, of a piston portion of the outer piston, which is axially displaceably guided on an inner lateral surface of the outer cylinder, is connected so as to communicate partially with surroundings of the shock absorber.

BRIEF DESCRIPTION OF THE SEVERAL VIEWS OF THE DRAWING(S)

Figure 2:
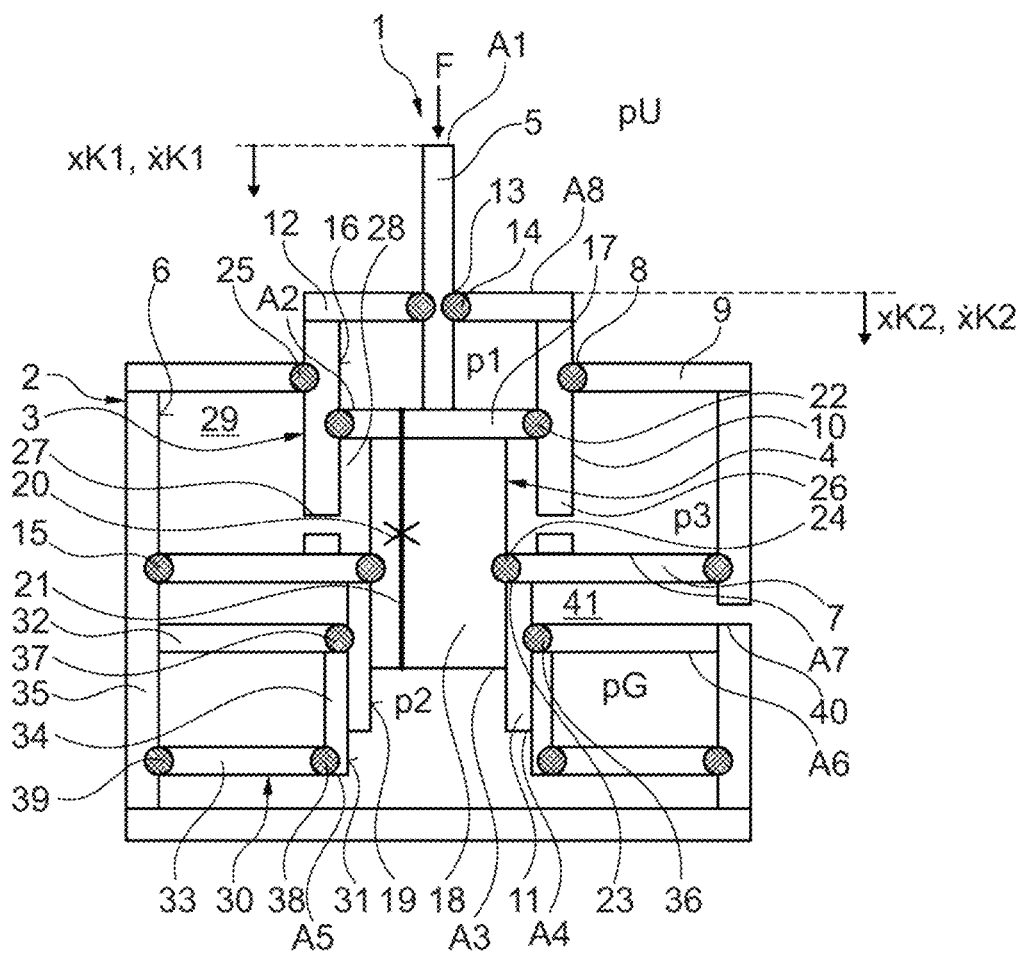

Having thus described the invention in general terms, reference will now be made to the accompanying drawings, which are not necessarily drawn to scale, and wherein:

FIG. 1 is a schematic view of a shock absorber according of an example embodiment; and FIG. 2 is a further schematic view of the shock absorber of FIG. 1 with identified functional surfaces according to of an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

An example embodiment may provide a shock absorber which has a large movement range and a shortest possible installation length in the fully compressed state. Such a shock absorber may, for example, include a surface, which is remote from the piston rod, of a piston portion of the outer piston which is axially displaceably guided on an inner lateral surface of the outer cylinder is connected so as to communicate partially with the surroundings of the shock absorber (e.g., the external areas outside the shock absorber, and therefore not enclosed by any structures of the shock absorber).

In this regard, some example embodiments may provide that the entire surface, which is remote from the piston rod, of the piston portion of the outer piston which is axially displaceably guided on the inner lateral surface of the outer cylinder is not subjected to an oil pressure but only one part thereof, whilst the remaining part of the surface is connected so as to communicate with the surroundings of the shock absorber. As a result, a static extension force of the shock absorber according to some example embodiments may be significantly reduced. The shock absorber of some example embodiments may be used for producing a wheel suspension of an agricultural vehicle, or a motor vehicle. The motor vehicle may be a passenger motor vehicle or a utility vehicle.

In some example embodiments, the outer piston has a cylinder portion which is concentrically connected to the piston portion and which is axially displaceably guided on a central guide opening on a front wall of the outer cylinder axially closing the outer cylinder on one side, and a guide portion which is arranged on a side of the piston portion opposing the cylinder portion and which is concentrically connected to the piston portion and which is of annular configuration. Additionally, the inner piston may have a piston portion which is axially displaceably guided on an inner lateral surface of the cylinder portion and which is connected to the piston rod, and a guide pin which is arranged on a side of this piston portion remote from the piston rod and which is concentrically connected to the piston portion, and which is axially displaceably guided on an inner lateral surface of the guide portion. At least one fluid channel may be provided with at least one piston valve runs axially through the piston portion of the inner piston and the guide pin. At least one opening is configured on a lateral surface of the cylinder portion, a working chamber which is located inside the cylinder portion and which is arranged on a side of the piston portion of the inner piston remote from the piston rod being connected thereby, so as to communicate with a working chamber which radially outwardly encloses the cylinder portion inside the outer cylinder and which is axially defined on one side by the piston portion of the outer piston. An inner cylinder which is of annular configuration and which is filled with a gas is immovably fastened to the inner lateral surface of the outer cylinder over the circumference, the guide portion of the outer piston being axially displaceably guided on the inner lateral surface thereof, and being closed on a side facing the piston portion of the outer piston by means of an annular terminal element and on a side remote from the piston portion of the outer piston by means of a separating piston which is axially displaceably guided inside the inner cylinder. At least one opening is configured on a portion of the outer cylinder which is arranged between the piston portion of the outer piston and the terminal element of the inner cylinder, an internal space which is present between the piston portion and the terminal element being connected thereby to the surroundings of the shock absorber.

The shock absorber may be denoted hereinafter as the triple-tube damper, wherein one tube is formed by the lateral surface of the outer cylinder, one tube by the lateral surface of the cylinder portion of the outer piston and one tube by the inner lateral surface of the inner cylinder. Since the piston rod which is connected to the piston portion of the inner tube and the outer piston are oriented concentrically to one another, and with an actuation of the piston rod are moved at the same time, the shock absorber has a significantly shortened fully compressed overall length. In comparison with a conventional twin-tube damper, this is associated with a greater flexibility in terms of constructional space. The shock absorber design permits, therefore, a damper overall length which is significantly shortened and at the same time an improved relationship of the damper stroke to the damper overall length.

The gas volume which is located inside the annular inner cylinder compensates for a volume change which is produced by the retraction of the inner piston and the outer piston. The separating piston is used for separating the gas volume from a lower oil volume which is defined by a portion of the outer cylinder, a portion of the inner cylinder, a portion of the guide portion of the outer piston and by a portion of the guide pin of the inner piston. This prevents the mixing of oil and gas and a concentration of gas in the oil and thus prevents cavitation phenomena on the at least one piston valve. By the separation of the gas volume from the lower oil volume by the separating piston, no consideration has to be given to the installed position of the gas volume. As a result, the shock absorber may be mounted in any orientation, even upside down, i.e. with a piston rod facing toward the ground.

A fixed separation of the surfaces of the outer piston and the inner cylinder is provided. As a result, an additional compensation gas volume is produced in the internal space between the piston portion of the outer piston and the terminal element of the inner cylinder. By this compensation gas volume a lower face of the outer piston facing the inner cylinder is divided into two regions. The pressure of the lower oil volume acts on the inner region of the lower face of the outer piston and the pressure of the compensating gas volume acts on the outer region of the lower face of the outer piston. By a suitable design of these two regions of the lower face of the outer piston, for example by reducing the second region, a static extension force of the shock absorber may be reduced to a sufficiently low level. The inner region of the lower face of the outer piston has no influence on the ratio between the outer piston and the inner piston. As a result, in comparison with previous solutions a great freedom of design is obtained in the layout of the shock absorber since the outer region of the lower face of the piston portion of the outer piston has no effect on a transmission ratio between the telescopic damping stages which are defined by the outer piston and the inner piston.

In an example embodiment, via the construction and the use of an additional gas volume, the shock absorber design may achieve an improved relationship of the damper stroke to the damper overall length than is possible in conventional damper designs. Moreover, example embodiments may contribute to solving the problem of the static gas forces being too high, which is usually present. Thus, an acceptable functioning of the shock absorber may be ensured.

The outer cylinder may have a cylindrically configured circumferential lateral surface, a base closing the lateral surface on an axial side, and the front wall closing the lateral surface on an opposing axial side, the central guide opening on which the cylinder portion of the outer piston is guided in a linearly displaceable manner being configured thereon. The outer cylinder may be configured in one piece or multiple pieces. The outer cylinder may be produced partially or entirely from a metal material, a plastics material, or a composite material, in particular a fiber composite material.

In an example embodiment, the outer piston may be produced partially or entirely from a metal material, a plastics material or a composite material, in particular a fiber composite material. The outer piston may be configured in one piece or multiple pieces. The piston portion of the outer piston may be sealed via at least one piston ring or a circumferential seal relative to the inner lateral surface of the outer cylinder. The cylinder portion may be sealed relative to the front wall via at least one seal which is arranged on the central guide opening on the front wall of the outer cylinder. The cylinder portion may be partially defined on its side facing the lower oil volume by the piston portion of the outer piston, wherein a guide opening is formed centrally and concentrically on the piston portion of the outer piston, the guide pin of the inner piston being guided thereon in a linearly displaceable manner. At least one circumferential seal may be arranged on the guide opening of the piston portion of the outer piston, the guide pin of the inner piston being sealed thereby relative to the piston portion of the outer piston. The annular and/or hollow-cylindrically configured guide portion of the outer piston may be configured to be tapered relative to a lateral surface of the cylinder portion of the outer piston, e.g., having a smaller internal diameter and a smaller external diameter than the lateral surface of the cylinder portion.

In an example embodiment, the inner piston may be produced partially or entirely from a metal material, a plastics material or a composite material, in particular a fiber composite material. The inner piston may be configured in one piece or multiple pieces. At least one circumferential seal may be arranged radially outwardly on the piston portion of the inner piston, the piston portion being sealed thereby relative to the inner lateral surface of the cylinder portion of the outer piston. The guide pin of the inner piston may be configured to be solid or hollow. At least one seal may be arranged circumferentially on the inner lateral surface of the annular guide portion of the outer piston, the guide pin of the inner piston being sealed thereby relative to the inner lateral surface of the guide portion. Additionally the guide pin of the inner piston may be axially displaceably guided on an inner lateral surface of the central guide opening on the piston portion of the outer piston. In this case the guide pin is preferably sealed relative to the inner lateral surface of the guide opening on the piston portion of the outer piston, via at least one circumferential seal arranged on the inner lateral surface of the guide opening on the piston portion of the outer piston. By means of the fluid channel which runs axially through the piston portion and the guide pin of the inner piston, during a damper stroke oil may flow from the lower oil volume to a first upper oil volume which is arranged inside the cylinder portion of the outer piston and on the side of the piston portion of the inner piston facing the piston rod, and vice versa.

In an example embodiment, via the opening which is configured on the lateral surface of the cylinder portion of the outer piston, a second upper oil volume which is arranged inside the cylinder portion of the outer piston and on a side of the piston portion of the inner piston remote from the piston rod is connected to a third upper oil volume which is arranged in the working chamber which radially outwardly encloses the cylinder portion of the outer piston inside the outer cylinder and is defined on an axial side by the piston portion of the outer piston and on an opposing side by the front wall of the outer cylinder.

In an example embodiment, the inner cylinder which is of annular configuration and which is filled with gas may have, in addition to the annular terminal element which is preferably fixedly connected to the lateral surface of the outer cylinder, an inner ring connected radially inwardly to the terminal element, the guide portion of the outer piston being axially displaceably guided on the inner lateral surface thereof. A radial outer ring of the inner cylinder may be formed by a portion of the lateral surface of the outer cylinder or as a separate component. The separating piston may be configured rigidly or elastically, for example as a diaphragm. The rigid separating piston may be configured as an annular disk and may be sealed relative to the remaining inner cylinder via at least one seal which is arranged circulating radially outwardly on the separating piston and at least one seal which is arranged circulating radially inwardly on the separating piston. The inner cylinder may be produced partially or entirely from a metal material, a plastics material or a composite material, in particular a fiber composite material. The inner cylinder may be configured in one piece or multiple pieces.

In an example embodiment, an internal space which is present between the piston portion of the outer piston and the terminal element may be connected via the opening on the outer cylinder so as to communicate with the surroundings of the shock absorber. As a result, the static extension force of the shock absorber may be reduced.

In an example embodiment, a shock absorber assembly may be provided having at least one shock absorber according to one of the aforementioned embodiments or a combination or at least two of these embodiments together and at least one pressure application device which is connected to the opening on the outer cylinder for applying gas to the internal space.

In some embodiments, advantages cited above relative to the shock absorber may be correspondingly combined with the shock absorber assembly. The static extension force of the shock absorber may be changed by the application of pressure to the internal space between the piston portion of the outer piston and the terminal element of the inner cylinder. As a result, a height control may be implemented in the vehicle without further components. Such a height control and/or increase in the static extension force of a shock absorber, when this function was integrated in a shock absorber, was conventionally possible only by means of additional components and an application of pressure to standard dampers. The shock absorber and/or three-tube damper according to the invention may fulfil this function without additional components and only requires the application of pressure by means of the pressure application device FIG. 1 shows a schematic representation of a shock absorber 1 according to an example embodiment for a wheel suspension (not shown), of a vehicle (not shown). The shock absorber 1 may include an outer cylinder 2, an outer piston 3 which is axially displaceably guided in the outer cylinder 2, an inner piston 4 which is axially displaceably guided in the outer piston 3, and a piston rod 5 which is connected to the inner piston 4 and which is guided out of the outer piston 3.

The outer piston 3 may include a piston portion 7, a cylinder portion 10, and a guide portion 11. The piston portion 7 may be axially displaceably guided on an inner lateral surface 6 of the outer cylinder 2. The cylinder portion 10 may be concentrically connected to the piston portion 7 and may be axially displaceably guided on a central guide opening 8 on a front wall 9 of the outer cylinder 2 closing the outer cylinder 2 axially on one side. The guide portion 11 may be arranged on a side of the piston portion 7 opposing the cylinder portion 10, which is concentrically connected to the piston portion 7 and which is configured in an annular manner.

A guide opening 13 may be formed on an axial front wall 12 of the cylinder portion 10, a seal 14 being arranged in a circumferential manner thereon and the piston rod 5 being sealed by said seal relative to the front wall 12. A circumferential seal 15 may be arranged radially outwardly on the piston portion 7. The piston portion 7 may be sealed by the circumferential seal 15 relative to the inner lateral surface 6 of the outer cylinder 2. A circumferential seal 25 may be arranged on the guide opening 8 of the front wall 9. The piston rod 5 may be sealed by the circumferential seal 25 relative to the front wall 9.

The inner piston 4 may have a piston portion 17 and a guide pin 18. The piston portion 17 may be axially displaceably guided on an inner lateral surface 16 of the cylinder portion 10 and may be connected to the piston rod 5. The guide pin 18 may be arranged on a side of this piston portion 17 remote from the piston rod 5 and may be concentrically connected to the piston portion 17, and may be axially displaceably guided on an inner lateral surface 19 of the guide portion 11. A fluid channel 21 may be provided with a piston valve 20 to run axially through the piston portion 17 and the guide pin 18 of the inner piston 4.

A circumferential seal 22 may be radially outwardly arranged on the piston portion 17. The piston portion 17 may be sealed by the circumferential seal 22 relative to the inner lateral surface 16 of the cylinder portion 10. The guide pin 18 may be additionally axially displaceably guided on a central through-opening 23 of the piston portion 7 of the outer piston 3. A circumferential seal 24 may be arranged on the through-opening 23 to seal the guide pin 18 relative to the piston portion 7 of the outer piston 3.

Lateral openings 27 may be formed on a lateral surface 26 of the cylinder portion 10, a working chamber 28 which is located inside the cylinder portion 10 and which is arranged on a side of the piston portion 17 of the inner piston 4 remote from the piston rod 5 being connected thereby so as to communicate with a working chamber 29 radially outwardly enclosing the cylinder portion 10 inside the outer cylinder 2 and axially defined on one side by the piston portion 7 of the outer piston 3.

An inner cylinder 30 which is of annular configuration and filled with a gas may be immovably fastened to the inner lateral surface 6 of the outer cylinder 2 over the circumference of the inner lateral surface 6 (e.g., over the entire circumference of the inside of the outer cylinder 2). The guide portion 11 of the outer piston 3 may be axially displaceably guided on an inner lateral surface 31 of the inner cylinder 30. The inner cylinder 30 may be closed on a side facing the piston portion 7 of the outer piston 3 with an annular terminal element 32 and on a side remote from the piston portion 7 of the outer piston 3 by means of a separating piston 33 which is axially displaceably guided inside the inner cylinder 30.

The inner cylinder 30 may additionally have an inner ring 34 which is connected fixedly to the terminal element 32 and which forms the inner lateral surface 31 of the inner cylinder 30. An outer ring of the inner cylinder 30 may be formed by a portion of a lateral surface 35 of the outer cylinder 2. A circumferential seal 37 may be arranged on an inner lateral surface 36 of the terminal element 32 which forms a part of the inner lateral surface 31 of the inner cylinder 30 to seal the guide pin 18 of the inner piston 4 relative to the inner cylinder 30. In each case a seal 38 and/or seal 39 may be arranged radially inwardly and radially outwardly on the separating piston 33 of annular configuration to seal the separating piston 33 relative to the lateral surface 35 of the outer cylinder 2 and the inner ring 34 of the inner cylinder 30.

An opening 40 may be formed on a portion of the outer cylinder 2 arranged between the piston portion 7 of the outer piston 3 and the terminal element 32 of the inner cylinder 30. An internal space 41 which is present between the piston portion 7 of the outer piston 3 and the terminal element 32 may be connected via the opening 40 on the outer cylinder 2 so as to communicate with the surroundings of the shock absorber 1. Alternatively, by forming a shock absorber assembly, not shown, the internal space 41 may be connected via a pressure application device, not shown, which is connected to the opening 40, for the application of gas to the internal space 41.

The surface, which may be remote from the piston rod 5, of the piston portion 7 of the outer piston 3 which is axially displaceably guided on an inner lateral surface 6 of the outer cylinder 2, may be connected via the opening 40 so as to communicate partially with the surroundings of the shock absorber 1.

FIG. 2 shows a further schematic view of the shock absorber 1 shown in FIG. 1 with the identified functional surfaces A1 to A8. pU is the ambient pressure which acts on the functional surface A8 of the outer piston 3, on the front-face functional surface A1 of the piston rod 5, and on the functional surface A6 via the opening 40.

A force F acting on the piston rod 5 may lead to a displacement xK1 of the piston rod 5 and the inner piston 4 and to an acceleration ẋK1 of the piston rod 5 and the inner piston 4. If the inner piston 4 is correspondingly displaced, the piston portion 17 of the inner piston 4 displaces the oil located in the working chamber 28, whereby the oil is introduced through the openings 27 into the working chamber 29 in which the pressure p3 prevails. The oil pressure p3 acts on the functional surface A7 on the piston portion 7 of the outer piston 3 thereby causing a displacement xK2 of the outer piston 3 and an acceleration ẋK2 of the outer piston 3.

A pressure p2 may be applied in a lower working chamber 42 filled with oil to act on the circular functional surface A3 on a lower front face of the guide pin 4, on the annular functional surface A4, on a lower front face of the guide portion 11 of the outer piston 3, on an annular functional surface A5 on a lower front face of the inner ring 34 of the inner cylinder 30 and on a lower face of the separating piston 33. A pressure pG may be applied inside the inner cylinder 30.

With a displacement xK2 of the outer piston 3, the oil located in the lower working chamber 42 may be displaced through the fluid channel 21 into an upper working chamber 43 inside the cylinder portion 10 of the outer piston 3, inside which a pressure p1 prevails in the upper working chamber 43.

The given geometry of the shock absorber 1 may result in a functional surface relationship $A1+A8+A7=A3+A4+A6$. If a transmission ratio $m=0.5$ is required between the outer piston 3 and the inner piston 4, this results in the relationship $m=(A2-A3)/(A2-A3+A7)=0.5$. This equation is fulfilled when $A7=A2-A3$ is provided. If this is used in the cited functional surface relationship, this results in $A8-A6=A4+2A3-A2-A1$.

The relationship $p3 \approx p2(A2+A4-A1)/2(A2-A3)$ is provided for the pressures p3 and p2, where $p2=pG$. This results in $p3=pG(A2+A4-A1)/2(A2-A3)$. If it is desired to keep the pressure in the working chamber 29 low, $p3=pG$ may be fixed. This results in $A4=A2-2A3+A1$. The pressure p3 in the working chamber 29 may thus be set by the size of the functional surface A4 on the lower front face of the guide portion 11 of the outer piston 3. This results in the static extension force FD of the shock absorber 1, where $FD=(pG-pU)(A1/2-A2/2+A3+A4/2)$. If the aforementioned relationship $A4=A2-2A3+A1$ is used in the formula for FD, this results in $FD=(pg-pU)A1$. Since the surface A1 is very small, a very small extension force is produced thereby.

In theory, it is even possible to reduce the static extension force FD to zero by $A4=A2-2A3-A1$ being selected.

Accordingly, a shock absorber for a wheel suspension of a vehicle may be provided. The shock absorber may include an outer cylinder, an outer piston that is axially displaceably guided in the outer cylinder, an inner piston that is axially displaceably guided in the outer piston, and a piston rod that is connected to the inner piston and that is guided out of the outer piston. A surface, which is located remote from the piston rod, of a piston portion of the outer piston, which is axially displaceably guided on an inner lateral surface of the outer cylinder, is connected so as to communicate partially with surroundings of the shock absorber.

The shock absorber of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the outer piston may further include a cylinder portion and a guide portion. The cylinder portion may be concentrically connected to the piston portion and is axially displaceably guided on a central guide opening on a front wall of the outer cylinder axially closing the outer cylinder on one side. The guide portion may be arranged on a side of the piston portion opposing the cylinder portion and is concentrically connected to the piston portion. The guide portion may have an annular configuration. In an example embodiment, the inner piston may include a piston portion and a guide pin. The piston portion may be axially displaceably guided on an inner lateral surface of the cylinder portion and is connected to the piston rod. The guide pin may be arranged on a side of the piston portion remote from the piston rod and is concentrically connected to the piston portion. The guide pin may be axially displaceably guided on an inner lateral surface of the guide portion. A fluid channel may be provided with at least one piston valve to run axially through the piston portion of the inner piston and the guide pin. In an example embodiment, an opening may be configured on a lateral surface of the cylinder portion. A first working chamber may be located inside the cylinder portion and is arranged on a side of the piston portion of the inner piston remote from the piston rod is connected by the opening so as to communicate with a second working chamber that radially outwardly encloses the cylinder portion inside the outer cylinder and that is axially defined on one side by the piston portion of the outer piston. An inner cylinder having an annular configuration may be filled with a gas and is immovably fastened to the inner lateral surface of the outer cylinder over a circumference of the inner lateral surface. The guide portion of the outer piston may be axially displaceably guided on the inner lateral surface of the guide portion. The inner cylinder may be closed on a side facing the piston portion of the outer piston via an annular terminal element and on a side remote from the piston portion of the outer piston via a separating piston that is axially displaceably guided inside the inner cylinder. In an example embodiment, an opening may be configured on a portion of the outer cylinder that is arranged between the piston portion of the outer piston and the terminal element of the inner cylinder. An internal space may be disposed between the piston portion and the terminal element and connected to the surroundings of the shock absorber by the opening.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A shock absorber for a wheel suspension of a vehicle, the shock absorber comprising:
    an outer cylinder;
    an outer piston that is axially displaceably guided in the outer cylinder;
    an inner piston that is axially displaceably guided in the outer piston; and
    a piston rod that is connected to the inner piston and that is guided out of the outer piston,
    wherein a surface, which is located remote from the piston rod, of a piston portion of the outer piston, which is axially displaceably guided on an inner lateral surface of the outer cylinder, is connected so as to communicate partially with surroundings of the shock absorber;
    wherein the outer piston further includes a cylinder portion;
    wherein an opening is configured on a lateral surface of the cylinder portion;
    wherein a first working chamber is located inside the cylinder portion of the outer piston on a side of a piston portion of the inner piston and the first working chamber is connected by the opening to communicate with a second working chamber that radially outwardly encloses the cylinder portion inside the outer cylinder and is axially defined on one side by the piston portion of the outer piston.

2. The shock absorber of claim 1, wherein the outer piston further includes a guide portion,
    wherein the cylinder portion is concentrically connected to the piston portion of the outer piston and is axially displaceably guided on a central guide opening on a front wall of the outer cylinder axially closing the outer cylinder on one side, and
    wherein the guide portion is arranged on a side of the piston portion of the outer piston opposing the cylinder portion and is concentrically connected to the piston portion of the outer piston, and wherein the guide portion has an annular configuration.

3. The shock absorber of claim 2, wherein the inner piston includes a guide pin,
    wherein the piston portion of the inner piston is axially displaceably guided on an inner lateral surface of the cylinder portion and is connected to the piston rod,
    wherein the guide pin is arranged on a side of the piston portion of the inner piston remote from the piston rod and is concentrically connected to the piston portion of the inner piston,
    wherein the guide pin is axially displaceably guided on an inner lateral surface of the guide portion, and
    wherein a fluid channel is provided with at least one piston valve to run axially through the piston portion of the inner piston and the guide pin.

4. The shock absorber of claim 1, wherein the inner piston includes a guide pin,
    wherein the outer piston further includes a guide portion;
    wherein the piston portion of the inner piston is axially displaceably guided on an inner lateral surface of the cylinder portion and is connected to the piston rod,
    wherein the guide pin is arranged on a side of the piston portion of the inner piston remote from the piston rod and is concentrically connected to the piston portion of the inner piston,
    wherein the guide pin is axially displaceably guided on an inner lateral surface of the guide portion, and
    wherein a fluid channel is provided with at least one piston valve to run axially through the piston portion of the inner piston and the guide pin.

5. The shock absorber of claim 1, wherein an outer opening is configured on a portion of the outer cylinder that is arranged between the piston portion of the outer piston and a terminal element of an inner cylinder, wherein an internal space is disposed between the piston portion and the terminal element and connected to the surroundings of the shock absorber by the outer opening.

6. A shock absorber for a wheel suspension of a vehicle, the shock absorber comprising:
an outer cylinder;
an outer piston that is axially displaceably guided in the outer cylinder;
an inner piston that is axially displaceably guided in the outer piston; and
a piston rod that is connected to the inner piston and that is guided out of the outer piston,
wherein a surface, which is located remote from the piston rod, of a piston portion of the outer piston, which is axially displaceably guided on an inner lateral surface of the outer cylinder, is connected so as to communicate partially with surroundings of the shock absorber;
wherein the inner piston includes a piston portion of the inner piston and a guide pin,
wherein the outer piston further includes a cylinder portion and a guide portion;
wherein the piston portion of the inner piston is axially displaceably guided on an inner lateral surface of the cylinder portion and is connected to the piston rod,
wherein the guide pin is arranged on a side of the piston portion remote from the piston rod and is concentrically connected to the piston portion of the inner piston,
wherein the guide pin is axially displaceably guided on an inner lateral surface of the guide portion, and
wherein a fluid channel is provided with at least one piston valve to run axially through the piston portion of the inner piston and the guide pin;
wherein an opening is configured on a lateral surface of the cylinder portion,
wherein a first working chamber is located inside the cylinder portion and is arranged on a side of the piston portion of the inner piston remote from the piston rod and is connected by the opening so as to communicate with a second working chamber that radially outwardly encloses the cylinder portion inside the outer cylinder and that is axially defined on one side by the piston portion of the outer piston,
wherein an inner cylinder having an annular configuration is filled with a gas and is immovably fastened to the inner lateral surface of the outer cylinder over a circumference of the inner lateral surface,
wherein the guide portion of the outer piston is axially displaceably guided on the inner lateral surface of the guide portion, and
wherein the inner cylinder is closed on a side facing the piston portion of the outer piston via an annular terminal element and on a side remote from the piston portion of the outer piston via a separating piston that is axially displaceably guided inside the inner cylinder.

7. The shock absorber of claim 6, wherein an outer opening is configured on a portion of the outer cylinder that is arranged between the piston portion of the outer piston and the terminal element of the inner cylinder,
wherein an internal space is disposed between the piston portion and the terminal element and connected to the surroundings of the shock absorber by the outer opening.

8. A shock absorber assembly for a wheel suspension of a vehicle, the assembly comprising:
a pressure application device; and
shock absorber operably coupled to the pressure application device, the shock absorber comprising:
an outer cylinder;
an outer piston that is axially displaceably guided in the outer cylinder;
an inner piston that is axially displaceably guided in the outer piston; and
a piston rod that is connected to the inner piston and that is guided out of the outer piston,
wherein a surface, which is located remote from the piston rod, of a piston portion of the outer piston, which is axially displaceably guided on an inner lateral surface of the outer cylinder, is connected so as to communicate partially with surroundings of the shock absorber;
wherein the outer piston further includes a cylinder portion;
wherein an opening is configured on a lateral surface of the cylinder portion;
wherein a first working chamber is located inside the cylinder portion of the outer piston on a side of a piston portion of the inner piston and the first working chamber is connected by the opening to communicate with a second working chamber that radially outwardly encloses the cylinder portion inside the outer cylinder and is axially defined on one side by the piston portion of the outer piston.

9. The assembly of claim 8, wherein the outer piston further includes a guide portion,
wherein the cylinder portion is concentrically connected to the piston portion of the outer piston and is axially displaceably guided on a central guide opening on a front wall of the outer cylinder axially closing the outer cylinder on one side, and
wherein the guide portion is arranged on a side of the piston portion of the outer piston opposing the cylinder portion and is concentrically connected to the piston portion of the outer piston, and
wherein the guide portion has an annular configuration.

10. The assembly of claim 9, wherein the inner piston includes a guide pin,
wherein the piston portion of the inner piston is axially displaceably guided on an inner lateral surface of the cylinder portion and is connected to the piston rod,
wherein the guide pin is arranged on a side of the piston portion of the inner piston remote from the piston rod and is concentrically connected to the piston portion of the inner piston,
wherein the guide pin is axially displaceably guided on an inner lateral surface of the guide portion, and
wherein a fluid channel is provided with at least one piston valve to run axially through the piston portion of the inner piston and the guide pin.

11. The assembly of claim 8, wherein the inner piston includes a guide pin,
wherein the outer piston further includes a guide portion;
wherein the piston portion of the inner piston is axially displaceably guided on an inner lateral surface of the cylinder portion and is connected to the piston rod,
wherein the guide pin is arranged on a side of the piston portion of the inner piston remote from the piston rod and is concentrically connected to the piston portion of the inner piston,
wherein the guide pin is axially displaceably guided on an inner lateral surface of the guide portion, and wherein a fluid channel is provided with at least one piston valve to run axially through the piston portion of the inner piston and the guide pin.

12. The assembly of claim 11,
wherein an inner cylinder having an annular configuration is filled with a gas and is immovably fastened to the inner lateral surface of the outer cylinder over a circumference of the inner lateral surface,
wherein the guide portion of the outer piston is axially displaceably guided on the inner lateral surface of the guide portion, and
wherein the inner cylinder is closed on a side facing the piston portion of the outer piston via an annular terminal element and on a side remote from the piston portion of the outer piston via a separating piston that is axially displaceably guided inside the inner cylinder.

13. The assembly of claim 12, wherein an outer opening is configured on a portion of the outer cylinder that is arranged between the piston portion of the outer piston and the terminal element of the inner cylinder,
wherein an internal space is disposed between the piston portion and the terminal element and connected to the surroundings of the shock absorber by the outer opening.

14. The assembly of claim 8, wherein an outer opening is configured on a portion of the outer cylinder that is arranged between the piston portion of the outer piston and a terminal element of an inner cylinder,
wherein an internal space is disposed between the piston portion and the terminal element and connected to the surroundings of the shock absorber by the outer opening.

15. The assembly of claim 14, wherein the pressure application device is operably coupled to the outer opening on the portion of the outer cylinder to apply gas to the internal space.

* * * * *